UNITED STATES PATENT OFFICE.

ARCANGELO M. J. TUMMINELLI, OF BALTIMORE, MARYLAND.

FIREPROOFING COMPOSITION.

1,126,132.  Specification of Letters Patent.  Patented Jan. 26, 1915.

No Drawing.  Application filed July 9, 1913.  Serial No. 778,165.

*To all whom it may concern:*

Be it known that I, ARCANGELO M. J. TUMMINELLI, a subject of the King of Italy, and resident of the city of Baltimore and State of Maryland, have invented a new and Improved Fireproofing Composition, of which the following is a specification.

My invention is an improved composition for use in fire-proofing wood or other similar fibrous material.

The composition is particularly useful in fire-proofing wood for building purposes, furniture, boat construction, etc.

In making up my compound, I proceed as follows: To make up about twenty-five gallons of the solution, I take the following ingredients in substantially the proportions stated and dissolve the same in water, to wit:—

| | |
|---|---|
| Alum | Lbs. 9.9 |
| Zinc sulfate ($ZnSO_4$) | Lbs. 9.9 |
| Manganous sulfate ($MnSO_4$) | Lbs. 3.3 to 9 |
| Sulfuric acid ($H_2SO_4$) 9% | Qts. 9 |

The quantity of manganous sulfate may vary from lbs. 3.3 to 9 according to the chemical purity or strength of the same, more being required of course when the commercial article is employed than when the chemically pure article is taken.

In lieu of the manganous sulfate, I may use manganese chlorid ($MnCl_2$) as a substitute in the composition.

As a modification of the composition, I may take the same proportion of the salts, alum, zinc sulfate, manganous sulfate, and 6% of sulfuric acid, and in making up a twenty-five gallon quantity add to the same about five quarts of a solution of sodium silicate ($SiNa_2O_3$) made in the following manner:—I take pulverized quartz lbs. 4.11, commercial soda (sodium carbonate) lbs. 3, charcoal oz. 5, and after a few minutes of heating, boil the same together with a little water until the silicate is formed. In that event when the silicate of soda is employed in connection with the first mentioned ingredients of my composition, I reduce the amount of salts employed to $\frac{1}{3}$ the quantity first above stated, and reduce the quantity of sulfuric acid employed to $\frac{1}{4}$.

In using my composition, the same is placed in suitable vats (metallic vats should be avoided, with the exception of lead vats, to prevent deterioration of the compound), and immerse the wood to be treated in a bath of the solution until the wood has become impregnated with the solution, after which the wood is removed and dried in any desired manner.

From the foregoing description the composition and manner of employing the same will be readily understood by those skilled in the art.

What I claim is:—

1. A fire-proofing composition, including alum, zinc sulfate, manganous sulfate, sulfuric acid and sodium silicate.

2. A fire-proofing composition composed of a solution of the following ingredients in substantially the proportions stated:—

| | |
|---|---|
| Alum | Lbs. 9.9 |
| Zinc sulfate ($ZnSO_4$) | Lbs. 9.9 |
| Manganous sulfate ($MnSO_4$) | Lbs. 3.3 to 9 |
| Sulfuric acid ($H_2SO_4$) 6% | Qts. 6 |
| Solution sodium silicate | Qts. 5 |

ARCANGELO M. J. TUMMINELLI.

Witnesses:
 J. H. CATALANO,
 AUGUSTUS M. BRADFORD.